United States Patent [19]

Dvorak

[11] Patent Number: 4,714,975
[45] Date of Patent: Dec. 22, 1987

[54] SELF-CONTAINED GROUND FAULT TEST FEATURE IN CIRCUIT BREAKER

[75] Inventor: Robert F. Dvorak, Mount Vernon, Iowa

[73] Assignee: Square D Company, Palatine, Ill.

[21] Appl. No.: 720,130

[22] Filed: Apr. 5, 1985

[51] Int. Cl.[4] .............................................. H02H 3/16
[52] U.S. Cl. ..................................................... 361/44
[58] Field of Search ....................... 361/42, 44, 45, 47, 361/50

[56] References Cited

U.S. PATENT DOCUMENTS

| Re. 31,147 | 2/1983 | Helwig, Jr. et al. | 361/44 X |
|---|---|---|---|
| 4,258,403 | 3/1981 | Shimp | 361/42 |
| 4,316,229 | 2/1982 | Helwig, Jr. | 361/42 |
| 4,378,579 | 3/1983 | Hudson, Jr. | 361/42 X |

Primary Examiner—A. D. Pellinen
Assistant Examiner—Derek S. Jennings
Attorney, Agent, or Firm—Larry I. Golden; Thomas B. Lindgren; Richard T. Guttman

[57] ABSTRACT

A self-contained test feature for ground fault protection systems in circuit breakers. The ground fault protection system includes a sensing transformer having a primary winding that sums the currents through the phase current transformers. Upon the occurrence of an actual ground fault, the sensing transformer will transmit a signal to cause the breaker to trip. The test feature includes a test transformer having its secondary winding electrically connected in parallel with the primary winding of the sensing transformer. The current path between the test transformer secondary winding and sensing transformer primary winding is completed only upon the activation of a test switch. The primary winding of the test transformer is hooked to an external current source to provide the necessary current to simulate the ground fault.

4 Claims, 1 Drawing Figure

SELF-CONTAINED GROUND FAULT TEST FEATURE IN CIRCUIT BREAKER

This invention relates to electric circuit breakers and is more particularly directed to circuit breakers having a ground fault protection system and a self-contained testing capability for that system.

BACKGROUND OF THE INVENTION

Many circuit breakers are equipped to detect ground faults in addition to overcurrents. National Electrical Code Regulations require that the ground fault protection capabilities of circuit breakers must be tested when the circuit breakers are installed. After breaker installation, the ground fault detection system is subsequently inspected during regular periodic maintenance of the breaker.

In the prior art, testing the circuit breaker ground fault detection system required that the circuit breaker power conductors be disconnected and a high current source be temporarily hooked to one of the phase conductors to inject a simulated ground fault current through that phase. An alternate testing method requires that a testing panel or monitoring panel be placed in or near the circuit breaker enclosure, occupying valuable space.

There is a need for a circuit breaker having the capability to test the performance of its ground fault protection system with minimal additional equipment, time and expense.

SUMMARY OF THE INVENTION

The preferred embodiment of the subject invention is shown herein as adapted for use with a three pole circuit breaker, although the invention may be adapted for use with any sensing equipment activated by a steady pulse of current. The current through all three phase current transformers is summed by the primary winding of a ground fault sensing transformer. When the sum of the currents through the three phase conductors is not equal to zero, a ground fault condition exists. The current through the primary winding is not equal to zero, and a current is induced in the secondary winding of the sensing transformer. The secondary winding is connected to a control circuit and provides a current to the control circuit upon the existence of a ground fault.

The preferred embodiment of the self-contained test feature utilizes a ground fault test transformer with its primary winding connected to an external 120 volt AC source. The secondary winding of the test transformer is electrically connected to the primary winding of the sensing transformer, with the circuit path between the two windings being completed only upon the activation of the ground fault test switch. Upon connecting the primary winding of the test transformer to the external voltage source and, closing of the test switch, a current is induced in the ground fault summing transformer, simulating a ground fault condition. The breaker trips or gives whatever indication it is set to do upon the occurrence of a ground fault condition.

Additional advantages of this design are low power dissipation and an absence of large wire wound resistors that generate large amounts of heat. Also, the external test voltage source is totally isolated from the trip unit which avoids any extraneous ground paths between the test power source ground and other grounds which might be connected to the trip unit.

It is an object of this invention to provide economical and efficient means of testing a circuit breaker ground fault protection apparatus integral to the circuit breaker.

DESCRIPTION OF THE PREFERRED EMBODIMENT

Figure 1:
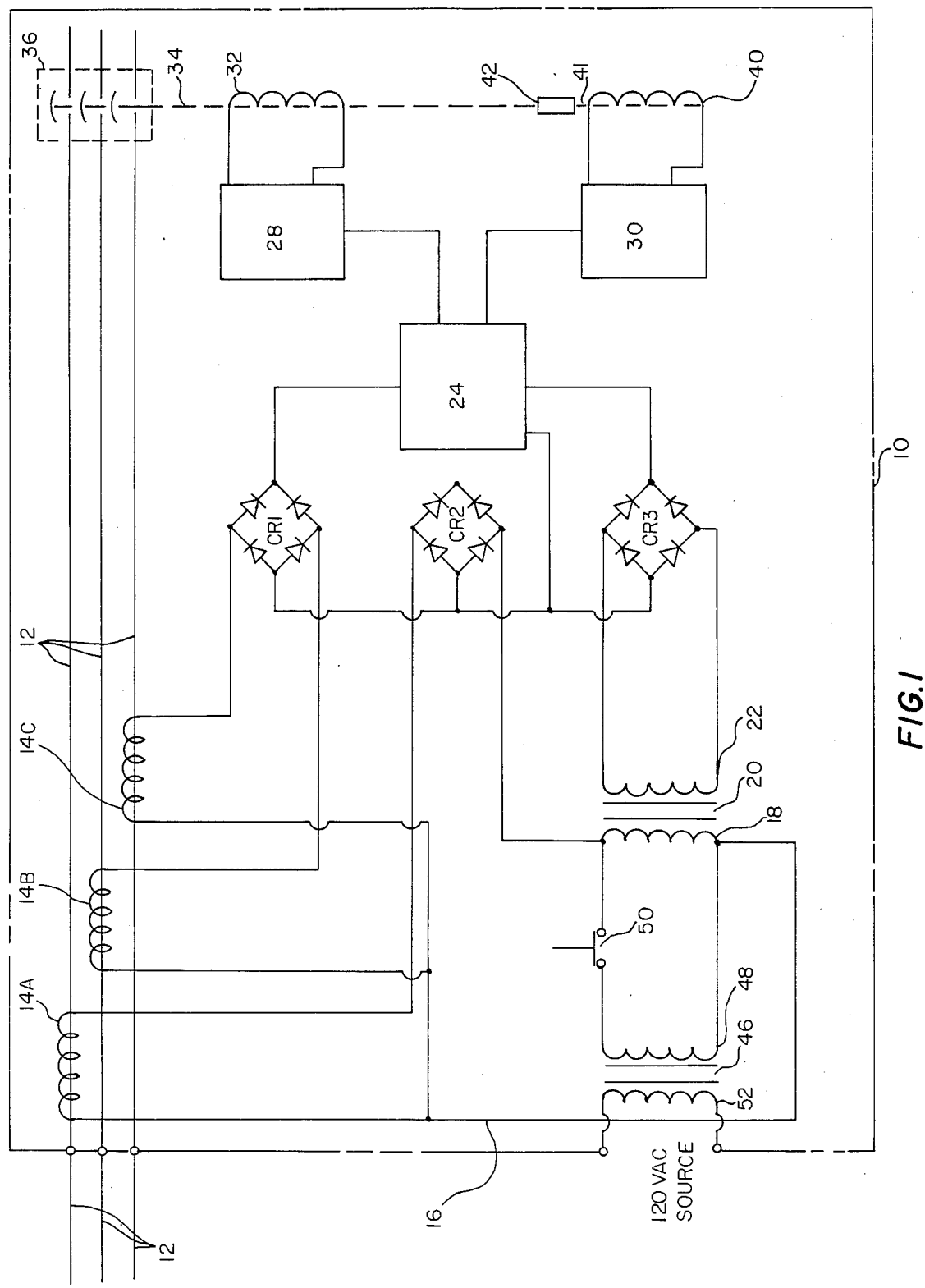
FIG. 1 is an electro-mechanical schematic of the preferred embodiment of the instant invention of the self-contained circuit breaker ground fault test system.

The self-contained ground fault test system is shown herein as applied to an electronic circuit breaker of the type described in U.S. Pat. Nos. 4,208,689 and 4,208,690, both entitled "Circuit Breaker Having an Electronic Fault-Sensing and Tripping Unit", issued to J. W. Dickens, et al, on June 17, 1980 and to J. P. McGinnis, et al, on June 17, 1980, respectively, both incorporated by reference herein.

The schematic of FIG. 1 shows the three phase conductors 12 connected to the circuit breaker 10. One current transformer, 14A, 14B or 14C, is associated with each respective phase conductor 12 and provides a signal proportional to the current through the phase conductor 12. One side of each current transformer 14A, 14B and 14C is connected to a lead 16 which is connected to the primary winding 18 of the ground fault sensing transformer, indicated generally as numeral 20. The other side of the primary winding 18 is connected to the input of a bridge CR2, the other input of which is supplied by the second side of current transformer 14A. The second respective sides of current transformers 14B and 14C are connected to the inputs of bridge CR1. The secondary winding 22 of the ground fault sensing transformer 20 is connected to the inputs of bridge CR3. The outputs of all bridges, CR1, CR2, and CR3, are supplied to a sensing circuit 24. Each bridge, CR1, CR2, and CR3, and the sensing circuit 24 are also connected to common ground via lead line 54.

The sensing circuit 24 sends a signal to both the trip circuit 28 and ground fault indicator circuit 30 upon the occurrence of a ground fault. The output of the trip circuit 28 is wired to a trip solenoid 32, that has a plunger 34 that controls the opening of the circuit breaker contacts, generally indicated as numeral 36. Upon the trip circuit 28 sensing an overcurrent or ground fault, the trip solenoid 32 is energized and the plunger 34 causes the the contacts 36 to move to the open position. The ground fault indicator circuit 30 is connected to a ground fault indicator coil 40 that has a plunger 41 to operate an indicator button 42 on the breaker panel upon the occurrence of a ground fault, as described herein.

The current flowing through current transformers 14A, 14B, and 14C is summed in the primary winding 18 of the ground fault sensing transformer 20. If the sum of the currents through the current transformers is not equal to zero, a ground fault condition exists and current is induced in the secondary winding 22 of the sensing transformer 20, sending a signal to the sensing circuit 24. If the signal is of a greater than a predetermined magnitude and time period, the sensing circuit will send a current signal to energize both the trip solenoid 32 and indicator coil 40, opening the breaker contacts and popping the indicator button 42 to indicate that a ground fault has occurred. The sensing circuit 24 may also be designed to only pop the indicator button 42 without activating the trip solenoid 32, or vice versa.

A ground fault test transformer 46 has its secondary winding 48 electrically connected in parallel to the primary winding 18 of the sensing transformer 20. The circuit between the secondary winding 48 and primary winding 18 is completed only upon the activation of a ground fault test switch 50. The primary winding 52 of the test transformer 46 is adapted for connection to an appropriate 120 volt AC source.

Upon the primary winding 52 being connected to the current source and the test switch 50 depressed to complete the circuit between the secondary winding 48 of the test transformer and the primary winding 18 of the sensing transformer 20, the current through the primary winding 52 induces a current in the secondary winding 48. Since the secondary winding 48 is directly connected to the primary winding 18 of the sensing transformer 20, the current through the secondary winding 48 simulates a ground fault condition in the primary winding 18 and induces a current in the secondary winding 22. The secondary winding 22 sends a ground fault signal to the sensing circuitry 24, causing the circuit breaker contacts 36 to open and the indicator button 42 to be activated, as described above.

While the invention has been shown and described with respect to the preferred embodiment, it will be understood by those skilled in the art that variations in form, construction and arrangement may be made therein without departing from the spirit and scope of the invention. All such variations are intended to be covered in the appended claims.

I claim:

1. An electric circuit breaker having the capability to detect the occurrence of a ground fault, said circuit breaker being connected to a phase conductor, said circuit breaker comprising:
    a pair of separable contacts;
    trip means connected to said contacts to separate said contacts upon the occurrence of an overcurrent;
    an indicator means to indicate the occurrence of a ground fault upon the receipt of a signal;
    signal means for sending a signal to said indicator means upon the occurrence of a simulated or actual ground fault, said signal means comprising a first transformer having a primary winding and a secondary winding, the primary winding being connected with the phase conductor, the secondary winding being electrically connected to said indicator means, wherein a current is induced in the secondary winding of said first transformer upon the occurrence of a simulated or actual ground fault; and
    a simulator to simulate a ground fault to activate said signal means by supplying a current to the primary winding of said first transformer, said simulator comprising a second transformer, having a primary winding and a secondary winding, the second transformer secondary winding being electrically connected to the first transformer primary winding.

2. An electric circuit breaker as claimed in claim 1 wherein said simulator additionally comprises a switch electrically connected between the first transformer primary winding and the second transformer secondary winding.

3. An electric circuit breaker connected to a line conductor, said circuit breaker comprising:
    a pair of separable contacts;
    trip means to separate said contacts upon the receipt of a current;
    sensing means to send a current to said trip means upon the detection of a fault in said circuit breaker;
    a first transformer having a primary winding connected with the line conductor and having a secondary winding electrically connected to said sensing means to inform said sensing means upon the occurrence of a fault in said circuit breaker; and
    a simulator connected to the primary winding of said first transformer, said simulator supplying a current to the primary winding upon activation to simulate a fault in said circuit breaker, said simulator further comprising a second transformer having a primary winding and a secondary winding, the second transformer secondary winding being electrically connected to the first transformer primary winding.

4. An electric circuit breaker as claimed in claim 3 wherein said simulator additionally comprises a switch electrically connected between the first transformer primary winding and the second transformer secondary winding.

* * * * *